March 8, 1927.
W. J. COBB
1,620,442
LOAD INDICATING MECHANISM
Filed May 17, 1926
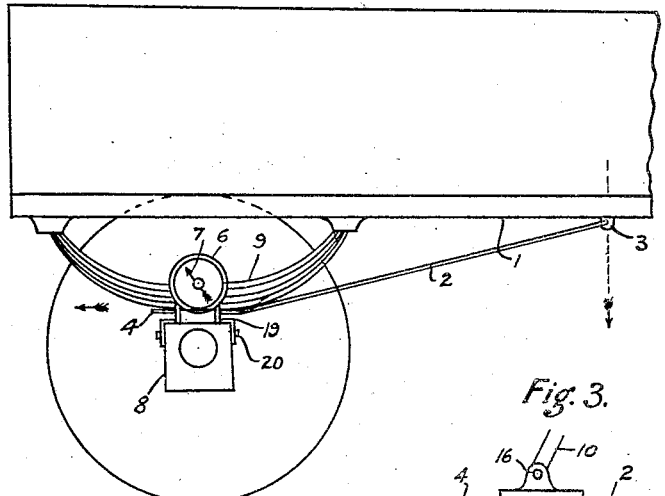
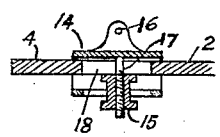
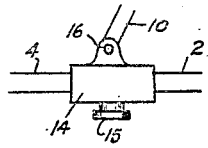
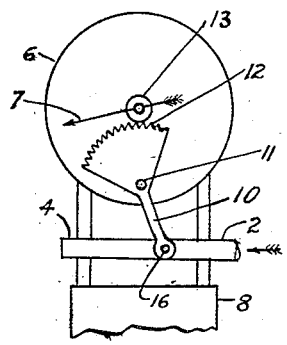
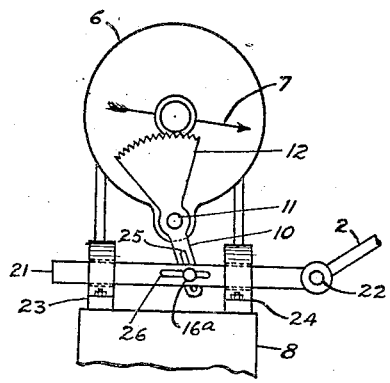
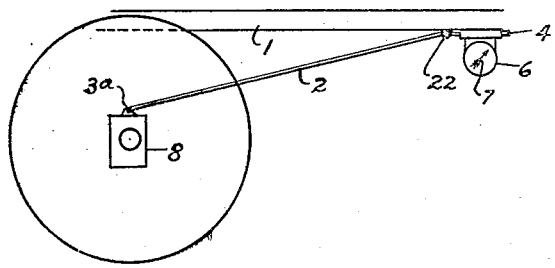
Inventor:
William John Cobb
By
Attorney Patented Mar. 8, 1927.

1,620,442

UNITED STATES PATENT OFFICE.

WILLIAM JOHN COBB, OF MOKAMEH, BRITISH INDIA, ASSIGNOR OF ONE-HALF TO HUGH WILLIAM McGUIRE, OF BENGAL, BRITISH INDIA.

LOAD-INDICATING MECHANISM.

Application filed May 17, 1926, Serial No. 109,794, and in British India April 6, 1925.

The object of this invention is an improved means for indicating the weight of commodities such as coal, grain, lime, stone or other material loaded in bulk whilst the same is being loaded up into a railway wagon, or into any other vehicle of similar nature such as a motor lorry.

One object is to provide an instrument which will be the means for stopping overloading or under-loading of coal or like commodities loaded in bulk. Such an instrument could be relied upon if the weighbridges were out of order.

The invention is intended to use the depression in the body of the wagon due to the compression of the wagon springs relatively to a fixed point, such as an axle or axle box, in order to indicate the increase in the load placed in the wagon.

For this purpose it is most convenient to use the differences in levels between a point on the underframe or body approximately about the centre of the wagon relatively to an axle box.

Provided the wagon is evenly loaded these relative levels may be used to indicate the load placed in the wagon.

It has been found that in most wagons a point may be selected on the underframe or body approximately midway between the ends of the wagon, which point is a convenient distance above a second point on or over one of the axle boxes. The greater the difference in level between the two selected points the better, but a difference of vertical distance of six or eight inches when the wagon is empty may be enough to give reliable results provided the maximum deflection of the springs is not more than three to four inches. Two such points may thus be selected on a wagon, one being sufficiently far above the other in vertical elevation that when connected together by a rod or member the alteration in the slope of the rod as the loading of the wagon is varied and the consequent endwise movement in an approximately horizontal direction of the free end of the said rod may be utilized to cause said free end to work a pointer or the like to indicate the weight added to or removed from the wagon.

The invention thus consists in a mechanism for indicating the weight of the contents of a railway wagon or other like vehicle whilst the same is being loaded, which mechanism depends for its operation upon the deflection of the vehicle springs and the increase in the depression of the body of the vehicle relatively to its axle. This mechanism comprises an actuating rod or member pivotally connected to a point adjacent to the centre of the vehicle, preferably a point on the underframe under the centre of the vehicle, which point in turn is directly connected to a second point on or above an axle-box by a rod or member; the approximately horizontal endwise movement of the suitably supported free end of the said rod or member, or part connected thereto, relatively to the axle or axle-box whilst alteration in the loading takes place being used to operate an indicator mounted on the said axle-box to indicate the alteration of load.

According to one embodiment of this invention, the end of the actuating rod or member may move a lever attached to a pivoted toothed sector, which in turn operates a pointer on a calibrated dial. The said rod or member may be a simple rod or tube having a floating connection to the recording mechanism. In this case, the rod may be stayed or guided on the outer and inner sides but may be capable of slight vertical displacements, for example in guides. Alternatively, the rod adjacent to the axle-box is provided with a pivot or knuckle, and its free end is adapted to slide horizontally in guides. The said horizontally endwise sliding end will in that case require a slotted connection between it and the indicating mechanism. Any other suitable mechanical equivalent means to effect the same purpose may be used.

Adjusting mechanism may be provided for correcting inaccuracies in the zero reading of the scale when the wagon is empty. For example, an adjusting slot may be made in the actuating rod or in the part connected thereto, said slot being adapted to have the lever operating the dial clamped therein, and the same may be so arranged that slight inaccuracies in the zero reading of the pointer on the dial may be corrected by unclamping, adjusting and reclamping the device.

It is not absolutely necessary for the free end of the actuating member, or the knuckle jointed slide connected thereto, if such is used, to work a dial fixed on the axle-box, as alternatively the said actuating rod or member may be fixed to the axle-box and the free end of the same may operate an indicating device fixed to the wagon body, preferably to the underframe at the centre of the wagon.

The invention will now be described with reference to the accompanying drawings wherein convenient forms it may take are illustrated by way of example. In these drawings:—

Figure 1 is a fragmental general elevation showing a device according to the invention fitted to a railway wagon.

Figure 2 is a diagram showing one manner in which the indication may be effected.

Figure 3 is a view showing how the zero reading of the scale may be adjusted.

Figure 4 is a section view of Fig. 3.

Figure 5 is a diagram of an embodiment using a knuckle connected horizontal slide; and Figure 6 is a general elevation of an alternative arrangement.

In these drawings, the bottom of the underframe 1 of the wagon has an actuating rod or member 2 pivotally fixed thereto at 3. The free end 4 of this rod is connected to operate a pointer 7 associated with a dial 6; Figs. 2 and 5 showing two types of connections which may be employed alternatively.

The dial may be securely fixed to an axle-box 8 of the wagon and will be calibrated so that the deflection of the point 3 of the wagon and the consequent slight movement in an approximately horizontal direction of the free end 4 of the actuating rod 2 relatively to box 8 will correctly indicate the weight increase, provided that the wagon is evenly loaded.

The major part of the movement of the point 3 will be due to the increase in the depression of the spring 9 but the whip or deformation of the underframe also may be taken into account in calibrating the dial.

In Figure 2 a floating connection between the operating rod 2 and the pointer 7 is illustrated, the free end of the rod 2 moving a lever 10 pivoted at 11. A toothed sector 12 operated by the lever 10 gears with a cog wheel 13 to which the pointer 7 is fixed. In this case the end 4 of the rod has not only an endwise, substantially horizontal movement when the vehicle body is depressed but also pivots slightly about pivot pin 16. It is advisable therefore to guide or stay the near and further sides of the rod 2, but to allow it room or clearance for slight angular displacements in the vertical direction around the momentary centre provided by the pin 16.

In the embodiment shown in Figure 2, and in order to allow for slight adjustments and corrections if the pointer does not correctly read to zero when the wagon is empty, the lever 10 may be pivoted at 16 to a sleeve like part 14 which, as shown in Figs. 3 and 4, is capable of sliding on the free end 4 of the member 2. This sleeve 14 is provided with a threaded pin 17 which extends laterally through a slot 18 in the rod end 4 and carries a nut 15 adapted to be tightened against said rod end, so that by loosening the nut the sleeve may be adjusted to set the pointer to zero, whereafter the nut may be retightened to hold the sleeve in adjusted position.

In Figure 5 another form the indicating device may take is illustrated. In this form, the end of the operating rod 2 is connected to a slide 21 by means of a knuckle joint 22. The slide 21 is mounted in two bearings 23, 24 fixed to, or carried by, the axle-box. As this slide accordingly has a horizontal endwise movement only, it will move tangentially about the pivotal point 11. To enable this movement to take place without binding, the pin 16$^a$ may work in the slot 25 in the arm 10. To permit of adjustment of the zero point on the scale, the pin 16$^a$ in this case may be shiftable in a slot 26 in the slide 21, being capable of being clamped securely in any desired position in said slot.

The fitting of the dial to the axle-box will not necessarily interfere with the existing parts of the axle-box or with the springs.

The instrument can be so arranged that the springs could be changed if needed without intefering with the instrument. With a new spring the dial would need to be recalibrated.

The dial and mechanism may be mounted on a part 19 fixed to the sides of the axle-box by bolts or the like 20.

A mica face to the dial would prevent the pointer being tampered with.

It will of course be understood that the invention is not restricted to the exact embodiment illustrated in Figure 1. For example, the rod 2 may be pivoted at 3$^a$ to the axle-box 8 as shown in Figure 6 and the free end 4 may operate the pointer 7 of a dial 6 fixed to the underframe at or near the point 3. Various refinements may be introduced, if desired.

It will of course be understood that the apparatus can be so arranged that the operating rod may be disconnected when the wagon is in transit. In the modification shown in Fig. 5 this may be done by disconnecting it at the knuckle joint 22.

Having now particularly described and ascertained the nature of my said invention and in what manner the same is to be performed, I declare that what I claim is:—

1. In a weighing mechanism, the combination, with a vertically-movable receiving element, a stationary supporting element disposed beneath the receiving element and at one side of its center, and spring means intermediate said elements and connected with the same; of mechanism for indicating the weight of the material in the receiving element during loading, comprising an indicator and a downwardly-inclined operating rod therefor constituting companion parts, one of which is directly attached to the central portion of the supporting element and the other to the under face of the receiving element at its central portion; the rod having a pivotal mounting at one end and having at its other end a substantially horizontal member, whereby the descent of the receiving element toward the supporting element as loading proceeds will cause said rod to swing in a vertical plane about its pivoted end and its horizontal member to move endwise relatively to the indicating device; and means interposed between said horizontal member and said indicating device for transmitting the endwise movement of the former to the latter.

2. A weighing mechanism, according to claim 1, in which the indicating device embodies a graduated dial, and a pointer movable thereover; and in which the transmission means between the horizontal member of the rod and the indicating device embodies a pivotally-mounted lever connected with said horizontal member to be rocked thereby, and a toothed sector actuated by said lever and itself operatively related with the pointer.

3. A weighing mechanism according to claim 1, in which the horizontal member of the operating rod has a knuckle-joint connection with the rod to enable relative movement therebetween; and in which the transmission means between said horizontal member and the indicating device embodies a pivotally-mounted lever with which the horizontal member has a pin-and-slot connection.

4. A weighing mechanism, according to claim 1, in which the transmission means between the indicating device and the horizontal member of the operating rod embodies a pivotally-mounted lever which is loosely connected to said member.

5. A weighing mechanism, according to claim 1, in which the transmission means between the indicating device and the horizontal member of the operating rod embodies a pivotally-mounted lever having a pin-and-slot connection with said member.

In testimony whereof I hereto affix my signature this 20th day of April, 1926.

WILLIAM JOHN COBB.